(12) United States Patent
Nishino (10) Patent No.: US 11,192,422 B2
(45) Date of Patent: Dec. 7, 2021

(54) SUSPENSION DEVICE FOR VEHICLES

(71) Applicant: MAZDA MOTOR CORPORATION, Hiroshima (JP)

(72) Inventor: Makoto Nishino, Hiroshima (JP)

(73) Assignee: MAZDA MOTOR CORPORATION, Hiroshima (JP)

(*) Notice: Subject to any disclaimer, the term of this patent is extended or adjusted under 35 U.S.C. 154(b) by 231 days.

(21) Appl. No.: 16/462,921

(22) PCT Filed: Nov. 1, 2017

(86) PCT No.: PCT/JP2017/039526
§ 371 (c)(1),
(2) Date: May 21, 2019

(87) PCT Pub. No.: WO2018/092587
PCT Pub. Date: May 24, 2018

(65) Prior Publication Data
US 2019/0329624 A1    Oct. 31, 2019

(30) Foreign Application Priority Data

Nov. 21, 2016 (JP) .............................. JP2016-225788

(51) Int. Cl.
*B60G 13/00* (2006.01)
*B60G 21/00* (2006.01)
(Continued)

(52) U.S. Cl.
CPC ........... *B60G 21/005* (2013.01); *B60G 7/001* (2013.01); *B60G 7/008* (2013.01); *B60G 11/14* (2013.01);
(Continued)

(58) Field of Classification Search
CPC .. B60G 13/005; B60G 13/006; B60G 13/008; B60G 2204/129
See application file for complete search history.

(56) References Cited

U.S. PATENT DOCUMENTS

| 4,911,467 A * | 3/1990 | Alesso ..................... B60G 3/26 |
| | | 280/124.133 |
| 5,496,055 A | 3/1996 | Shibahata et al. |
| | | (Continued) |

FOREIGN PATENT DOCUMENTS

| DE | 102014203886 A1 | 10/2014 |
| EP | 2338707 A1 | 6/2011 |
| | (Continued) | |

OTHER PUBLICATIONS

Hamada et al., Suspension device of Automobile, May 23, 2000, EPO, JP 2000-142060 A, English Abstract (Year: 2000).*

(Continued)

*Primary Examiner* — James A English
(74) *Attorney, Agent, or Firm* — Studebaker & Brackett PC (57) ABSTRACT

A suspension device (rear suspension (10)) for vehicles is provided which includes a damper (40), a shaft (50) pivotably supporting an end of the damper (40), and a bush (60) including a cylindrical elastic member fitted onto the outer circumference of the shaft (50). The axis (C2) of the bush (60) is disposed along a line of intersection between an imaginary first plane (S1) and an imaginary second plane (S2), or along a line parallel to the line of intersection. The first plane (S1) is orthogonal to the axis (C1) of the damper (40) when a stroke position of a wheel (24) is a first position relative to the vehicle body (80) in the vertical direction of a vehicle body (80). The second plane (S2) is orthogonal to
(Continued)

the axis (C1) of the damper (40) when the stroke position of the wheel (24) is a second position.

14 Claims, 10 Drawing Sheets

(51) Int. Cl.
    *B60G 7/00*     (2006.01)
    *B60G 11/14*     (2006.01)

(52) U.S. Cl.
    CPC ......... *B60G 13/003* (2013.01); *B60G 13/005* (2013.01); *B60G 2200/14* (2013.01); *B60G 2204/128* (2013.01); *B60G 2204/1226* (2013.01); *B60G 2204/1244* (2013.01); *B60G 2204/1484* (2013.01)

(56) References Cited

U.S. PATENT DOCUMENTS

| | | | |
|---|---|---|---|
| 5,685,556 A | | 11/1997 | Shibue et al. |
| 2010/0032920 A1* | | 2/2010 | Hong ................... B60G 15/068 |
| | | | 280/124.109 |
| 2018/0001725 A1* | | 1/2018 | Andou ................... B60G 7/001 |

FOREIGN PATENT DOCUMENTS

| | | | | | |
|---|---|---|---|---|---|
| FR | 2496208 A1 | * | 6/1982 | ........... | B60G 13/001 |
| FR | 3021585 A1 | | 12/2015 | | |
| JP | H06-055918 A | | 3/1994 | | |
| JP | H08-244430 A | | 9/1996 | | |
| JP | 11115427 A | * | 4/1999 | | |
| JP | H11-301229 A | | 11/1999 | | |
| JP | 2000142060 A | * | 5/2000 | ........... | B60G 21/051 |
| JP | 3755713 B2 | | 3/2006 | | |
| JP | 2006248243 A | * | 9/2006 | | |
| JP | 2016-159770 A | | 9/2016 | | |

OTHER PUBLICATIONS

Hamada et al., Suspension device of Automobile, May 23, 2000, EPO, JP 2000-142060 A, Machine translation of Description (Year: 2000).*
Osaki et al., Mounting Structure for Shock Absorber, Sep. 21, 2006, EPO, JP2006-248243 A, English Abstract (Year: 2006).*
Osaki et al., Mounting Structure for Shock Absorber, Sep. 21, 2006, EPO, JP2006-248243 A, Machine translation of Description (Year: 2006).*
Clause Lambert, Mounting bush for telescopic shock absorber—has slotted rubber insert for variable torsional flexibility between bearing rings, Jun. 18, 1982, EPO, FR 2496208 A1, English Abstract (Year: 1982).*
Clause Lambert, Mounting bush for telescopic shock absorber—has slotted rubber insert for variable torsional flexibility between bearing rings, Jun. 18, 1982, EPO, FR 2496208 A1, Machine Translation of Description (Year: 1982).*
International Search Report issued in PCT/JP2017/039526; dated Dec. 26, 2017.

* cited by examiner

LEFT (OUTSIDE) ←——→ RIGHT (INSIDE)
VEHICLE
WIDTH
DIRECTION

FIG.8

SUSPENSION DEVICE FOR VEHICLES

TECHNICAL FIELD

The present invention relates to a suspension device for vehicles.

BACKGROUND ART

An extendable and retractable damper of a suspension device for vehicles is described in, for example, Patent Document 1. This damper is mounted such that the lower end of the damper is connected to a wheel of the vehicle via components such as a knuckle, and the upper end of the damper is connected to a vehicle body of the vehicle. When the wheel rides up and down (i.e., bumps and rebounds) relative to the vehicle body, the damper is retracted or extended while changing its orientation (an inclination angle relative to the vertical direction of the vehicle body) as appropriate in accordance with the change in positional relation of the damper between the upper end (vehicle body) and the lower end (wheel).

The lower end and/or the upper end of such dampers are, in some cases, pivotably supported by a certain shaft via a bush including an elastic member that is fitted onto the outer circumference of the shaft.

When the wheel rides up and down on bumps and rebounds, the damper pivots about the axis of the bush and causes torsion (rotation about the axis of the bush) in the bush. At the same time, the angle between the axis of the bush and the axis of the damper varies, which causes deformation of the bush due to prying forces (rotation about an axis perpendicular to the axis of the bush). Such torsion and deformation due to prying forces cause reaction force from the bush, and the reaction force increases friction in the damper and prevents smooth operation of the damper. Lack of smoothness of the damper may degrade ride comfort or handling stability of the vehicle.

In general, the spring constant of a bush about an axis perpendicular to the axis of the bush is about twice as great as the spring constant about the axis of the bush. In this regard, a larger reaction force is generated from the deformation due to prying forces than from the torsion of the bush when the wheel rides up and down on bumps and rebounds. To operate the damper smoothly, reducing such deformation of the bush due to prying forces is more effective.

Such deformation due to prying forces can occur in the bush when the axis of the bush is arranged to be inclined relative to the direction perpendicular to the axis of the damper. If the axis of the bush is disposed along the direction perpendicular to the axis of the damper and this disposition is kept regardless of the stroke position of the wheel relative to the vehicle body in the vertical direction of the vehicle body, the deformation of the bush due to prying forces can be prevented on all occasions.

CITATION LIST

Patent Document

PATENT DOCUMENT 1: Japanese Unexamined Patent Publication No. H11-301229

SUMMARY OF THE INVENTION

Technical Problem

However, designing a vehicle suspension device has various restrictions on layout in relation to the nearby components, and accordingly, dampers are often arranged to be inclined relative to the vertical direction of the vehicle body. The inclination angle varies in accordance with the bump and rebound strokes of the wheel.

Even if the axis of the bush is disposed along the direction perpendicular to the axis of the damper in a certain stroke state of the wheel, the axis of the bush is inclined relative to the direction perpendicular to the axis of the damper in another stroke state of the wheel. It is therefore difficult to prevent deformation of the bush due to prying forces on all occasions.

The present invention has been made in view of the foregoing, and it is an object of the present invention to provide a suspension device for vehicles that can prevent deformation, due to prying forces, of a bush for use to support an end of a damper, regardless of a stroke position of a wheel relative to the vehicle body in the vertical direction of the vehicle body.

Solution to the Problem

To achieve the object above, an embodiment of the present invention is directed to a suspension device for vehicles including: a damper disposed between a wheel of a vehicle and a vehicle body of the vehicle and configured to extend and retract between the wheel and the vehicle body; a shaft configured to pivotably support an end of the damper; and a bush including a cylindrical elastic member fitted onto an outer circumference of the shaft and interposed between the shaft and the damper. An axis of the bush is disposed along a line of intersection between an imaginary first plane and an imaginary second plane, or along a line parallel to the line of intersection, the first plane being orthogonal to an axis of the damper when a stroke position of the wheel is a first position relative to the vehicle body in a vertical direction of the vehicle body, the second plane being orthogonal to the axis of the damper when the stroke position of the wheel is a second position different from the first position.

This configuration can substantially prevent deformation of the bush due to prying forces by disposing the axis of the damper so as to be orthogonal to the axis of the bush when the stroke position of the wheel is either the first position or the second position relative to the vehicle body in the vertical direction of the vehicle body. When the stroke position of the wheel is at any position between the first position and the second position, this configuration allows the intersection angle between the axis of the damper and the axis of the bush to be always close to the right angle, and thus can effectively reduce deformation of the bush due to prying forces.

Setting the first position and the second position properly as the stroke position of the wheel can effectively reduce deformation of the bush due to prying forces in various stroke states of the wheel during a drive, which can in turn effectively reduce an increase in friction in the damper caused by the reaction force of the bush. In this regard, the damper can operate smoothly, thereby providing a better ride comfort and handling stability of the vehicle.

According to an aspect of the suspension device for vehicles, the first position is close to a bump side relative to a predetermined reference position and the second position is close to a rebound side relative to the reference position.

The predetermined reference position can be determined freely. The predetermined reference position may be a position when, for example, the vehicle stopping on a horizontal road surface carries a certain amount of load. The certain amount of load can be determined freely. The certain amount of load may be, for example, a load of the vehicle carrying no person or no cargo, but with a full fuel tank.

The bump side indicates the upward stroke of the wheel toward the vehicle body and the rebound side indicates the downward stroke of the wheel away from the vehicle body.

The above configuration can dispose the axis of the damper so as to be orthogonal to the axis of the bush when the stroke position of the wheel is the first position close to the bump side relative to the predetermined reference position and when the stroke position of the wheel is the second position close to the rebound side relative to the predetermined reference position. This configuration can substantially prevent deformation of the bush due to prying forces. In addition, the above configuration can effectively reduce deformation of the bush due to prying forces when a wheel burns and rebounds while the vehicle is running. In this regard, the damper operates smoothly, thereby providing good ride comfort and good handling stability of the vehicle.

The second position according to the above aspect may be a position in which the damper is most extended.

This configuration can dispose the axis of the damper so as to be orthogonal to the axis of the bush when the stroke position of the wheel is the second position in which the damper is most extended. When the stroke position of the wheel is at any position between the predetermined reference position and the second position (that is, at any stroke position in the entire range of the wheel stroke from the predetermined reference position to the position closest to the rebound side), the intersection angle between the axis of the damper and the axis of the bush is always an angle close to the right angle. This configuration can effectively reduce deformation of the bush due to prying forces when the wheel rebounds.

This configuration also makes it possible to mount the bush to a predetermined position without any deformation of the bush due to prying forces when the bush is mounted to a certain position with the damper fully extended in a vehicle production process. The second position may be determined in this mounting process.

The first position according to the above aspect may be a position at a time when two people having a certain weight are seated in the front seats of the vehicle stopping on a horizontal road surface.

This configuration can substantially reduce deformation of the bush due to prying forces when a driver and a passenger are seated in the front seats (the driver's seat and the passenger seat) of the vehicle, which is a situation typically and highly frequently seen in a vehicle. This configuration can provide a better ride comfort and handling stability of the vehicle.

The first position according to the above aspect may be a position in which the damper is most retracted.

This configuration can dispose the axis of the damper so as to be orthogonal to the axis of the bush when the stroke position of the wheel is the first position in which the damper is most retracted. When the stroke position of the wheel is at any position between the predetermined reference position and the first position (that is, at any stroke position in the entire range of the wheel stroke from the predetermined reference position to the position closest to the bump side), the intersection angle between the axis of the damper and the axis of the bush is always an angle close to the right angle. This configuration can effectively reduce deformation of the bush due to prying forces when the wheel bumps.

According to another aspect of the suspension device for vehicles, the suspension device further includes: a knuckle configured to support the wheel; a trailing arm connected to the knuckle and extending in a vehicle's longitudinal direction; and a connecting part configured to connect a front portion of the trailing arm in the vehicle's longitudinal direction to the vehicle body. The axis of the damper is inclined inward in a vehicle width direction toward a top of the vehicle. The bush is fitted onto the outer circumference of the shaft that connects a lower end of the damper to a rear portion of the trailing arm in the vehicle's longitudinal direction. The axis of the bush is inclined frontward in the vehicle's longitudinal direction toward an inside in the vehicle width direction.

As described above, the axis of the damper is inclined inward in the vehicle width direction toward the top of the vehicle, and the lower end of the damper is connected to the rear portion of the trailing arm via the shaft and the bush. In this configuration, disposing the axis of the bush so as to be inclined frontward in the vehicle's longitudinal direction toward the inside in the vehicle width direction allows the axis of the damper to be disposed at the right angle with respect to the axis of the bush when the stroke position of the wheel is the first position and when the stroke position is the second position. This is a specific example to implement the present invention.

According to still another aspect of the suspension device for vehicles, the suspension device further includes: a knuckle configured to support the wheel; a trailing arm connected to the knuckle and extending in a vehicle's longitudinal direction; and a connecting part configured to connect a front portion of the trailing arm in the vehicle's longitudinal direction to the vehicle body. The axis of the damper is inclined outward in a vehicle width direction toward a top of the vehicle. The bush is fitted onto the outer circumference of the shaft that connects a lower end of the damper to a rear portion of the trailing arm in the vehicle's longitudinal direction. The axis of the bush is inclined rearward in the vehicle's longitudinal direction toward an inside in the vehicle width direction.

As described above, the axis of the damper is inclined outward in the vehicle width direction toward the top of the vehicle, and the lower end of the damper is connected to the rear portion of the trailing arm via the shaft and the bush. In this configuration, disposing the axis of the bush so as to be inclined rearward in the vehicle's longitudinal direction toward the inside in the vehicle width direction allows the axis of the damper to be disposed at the right angle with respect to the axis of the bush when the stroke position of the wheel is the first position and when the stroke position is the second position. This is another specific example to implement the present invention.

Advantages of the Invention

As described above, a suspension device for vehicles according to the present invention can effectively reduce deformation of a bush due to prying forces in various stroke states of the wheel during a drive. This configuration can effectively reduce an increase in friction in the damper caused by the reaction force of the bush. In this regard, the damper can operate smoothly, thereby providing a better ride comfort and handling stability of the vehicle.

BRIEF DESCRIPTION OF THE DRAWINGS

FIG. 5A illustrates a process in which an assembly placed on a lift is raised toward left and right dampers and bushes, which have already been mounted to the vehicle body.

FIG. 5B illustrates a process of mounting the bushes, attached to lower ends of the dampers, to pairs of brackets attached to trailing arms.

DESCRIPTION OF EMBODIMENT

An exemplary embodiment of the present invention will be described in detail below with reference to the drawings.

Figure 1:
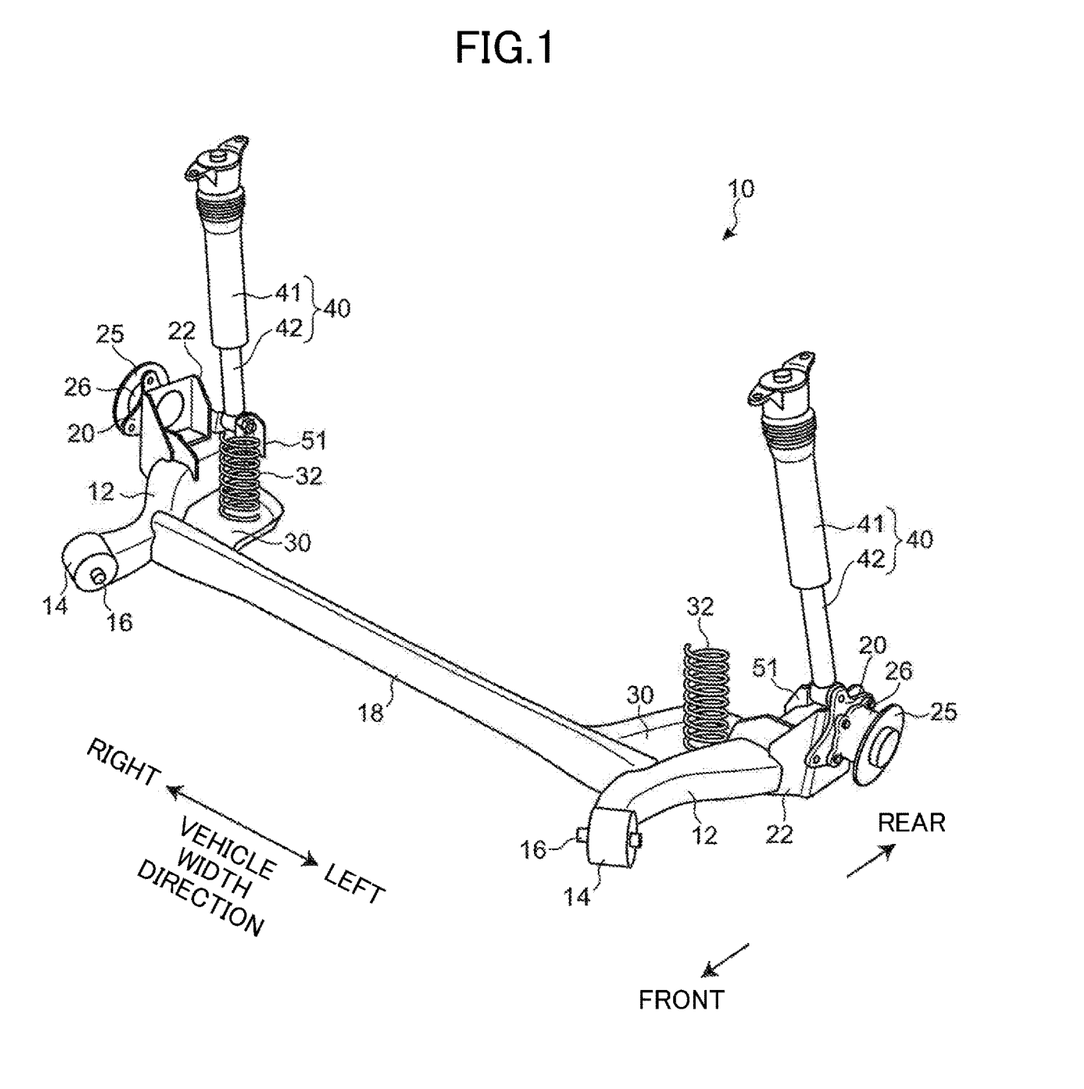
FIG. 1 is a perspective view of a rear suspension that is a suspension device for vehicles according to an exemplary embodiment of the present invention.

FIG. 1 illustrates a rear suspension 10 (hereinafter simply referred to as a suspension 10) that is a suspension device for vehicles according to an exemplary embodiment. In the following description, the front and rear, left and right, and top and bottom with respect to a vehicle body 80 (see FIGS. 2A, 2B, 3A and 3B) of a vehicle are simply referred to as front and rear (or longitudinal direction), left and right (or width direction), and top and bottom (or vertical direction).

The suspension 10 is a torsion beam suspension including a pair of left and right trailing arms 12 extending in the longitudinal direction of the vehicle and a torsion beam 18 extending in the vehicle width direction (left-right direction) and connecting the left and right trailing arms 12.

A cylindrical bush 14 is attached to a front end of each trailing arm 12. The bush 14 includes a cylindrical elastic member made of rubber. The inner and outer circumferential surfaces of the bush 14 are defined by, for example, inner and outer metal tubes.

The bush 14 is fitted onto the outer circumference of a shaft 16 defining a swing axis of the trailing arm 12. This means that the bush 14 is interposed between the shaft 16 and the trailing arm 12. The axis of the shaft 16, or the axis of the bush 14, is inclined rearward toward the outside in the vehicle width direction.

The shaft 16 is mounted to, for example, a support member 83 (see FIGS. 3A and 3B) mounted and fixed to a rear-side frame 82 of the vehicle body 80, and accordingly, the shaft 16 is supported by the vehicle body 80. The shaft 16 corresponds to a connecting part that connects the front portion of the trailing arm 12 to the support member 83, which can be regarded as part of the vehicle body 80.

The torsion beam 18 is made of, for example, a steel material having an inverted U-shaped cross-section opening downward. The opposing ends of the torsion beam 18 are each connected to a portion of the trailing arm 12 located between the middle and the front end of the trailing arm 12 in its longitudinal direction. Since the torsion beam 18 is tolerant of torsion, left and right wheels (rear wheels) 24 (see FIGS. 2A, 2B, 3A, and 3B) can move individually of each other in the vertical direction relative to the vehicle body 80. Moreover, with the torsional stiffness of the torsion beam 18, the body roll of the vehicle can be reduced.

In addition to the trailing arms 12 and the torsion beam 18, the suspension 10 further includes, for each wheel 24, a knuckle 20 that supports a hub 25 of the wheel 24, a coil spring 32 interposed between the wheel 24 and the vehicle body 80 and absorbing shock applied to the wheel 24, and a damper 40 that absorbs oscillation of the coil spring 32. The damper 40 is disposed between the wheel 24 and the vehicle body 80 (specifically, a rear wheelhouse 81 which will be described later) and is configured to extend and retract in the axial direction of the damper 40.

The knuckle 20 rotatably supports the hub 25 of the wheel 24 via a bearing 26. The knuckle 20 is fixed to a rear portion of the trailing arm 12 via a bracket 22.

The coil spring 32 is sandwiched between a lower spring seat 30 and an upper spring seat (not illustrated) in the vertical direction. The lower spring seat 30 is disposed at a corner portion between the trailing arm 12 and the torsion beam 18. The upper spring seat is fixed to the vehicle body 80. The lower spring seat 30 is disposed inside of the trailing arm 12 in the vehicle width direction and at the rear of the torsion beam 18. The lower spring seat 30 is fixed to the trailing arm 12.

The damper 40 is an extendable and retractable damper including a cylinder 41 and a piston rod 42 projecting downward from the cylinder 41. In the present embodiment, the cylinder 41 of each damper 40 is connected to the vehicle body and the piston rod 42 is connected to the wheel, but the positions of the cylinder 41 and the piston rod 42 may be inverted and the piston rod 42 may be connected to the vehicle body and the cylinder 41 may be connected to the wheel.

Figure 2A:
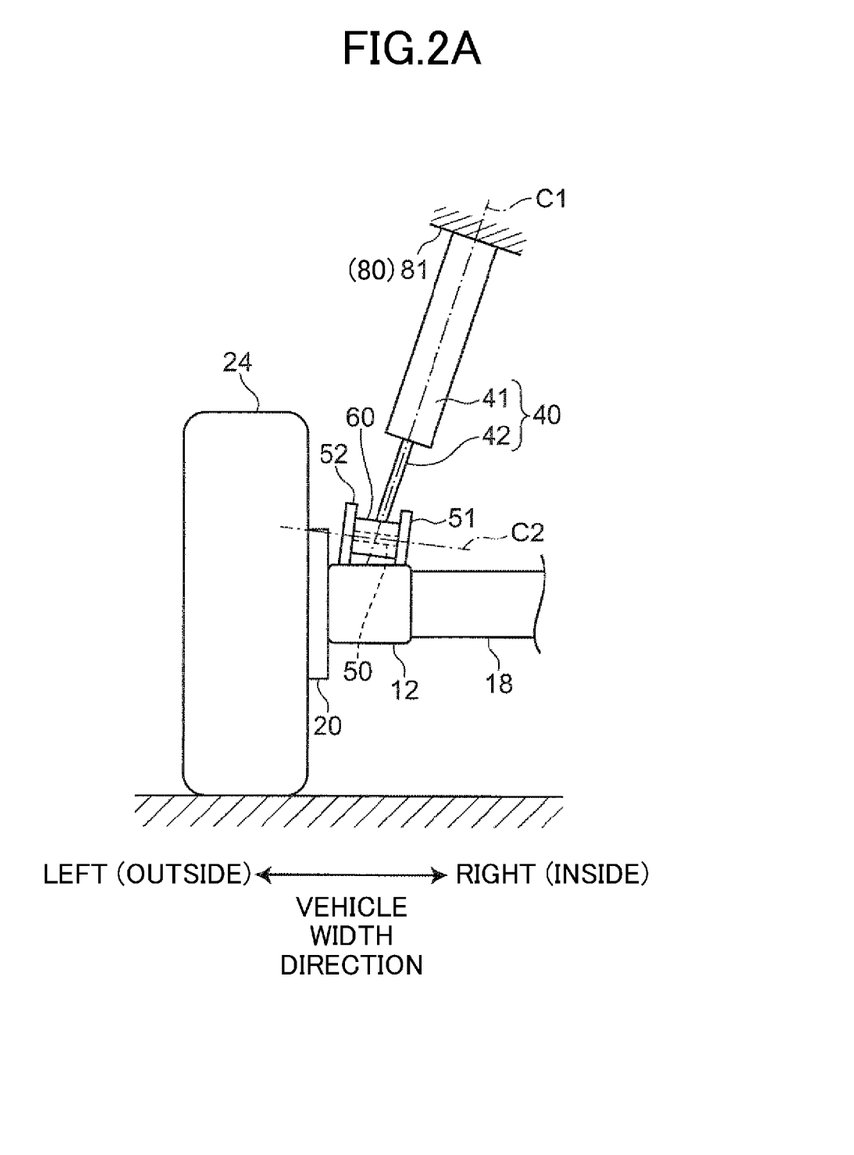
FIG. 2A is a schematic view seen from the rear of a vehicle body, illustrating a left damper and nearby components when a wheel bumps.
Figure 2B:
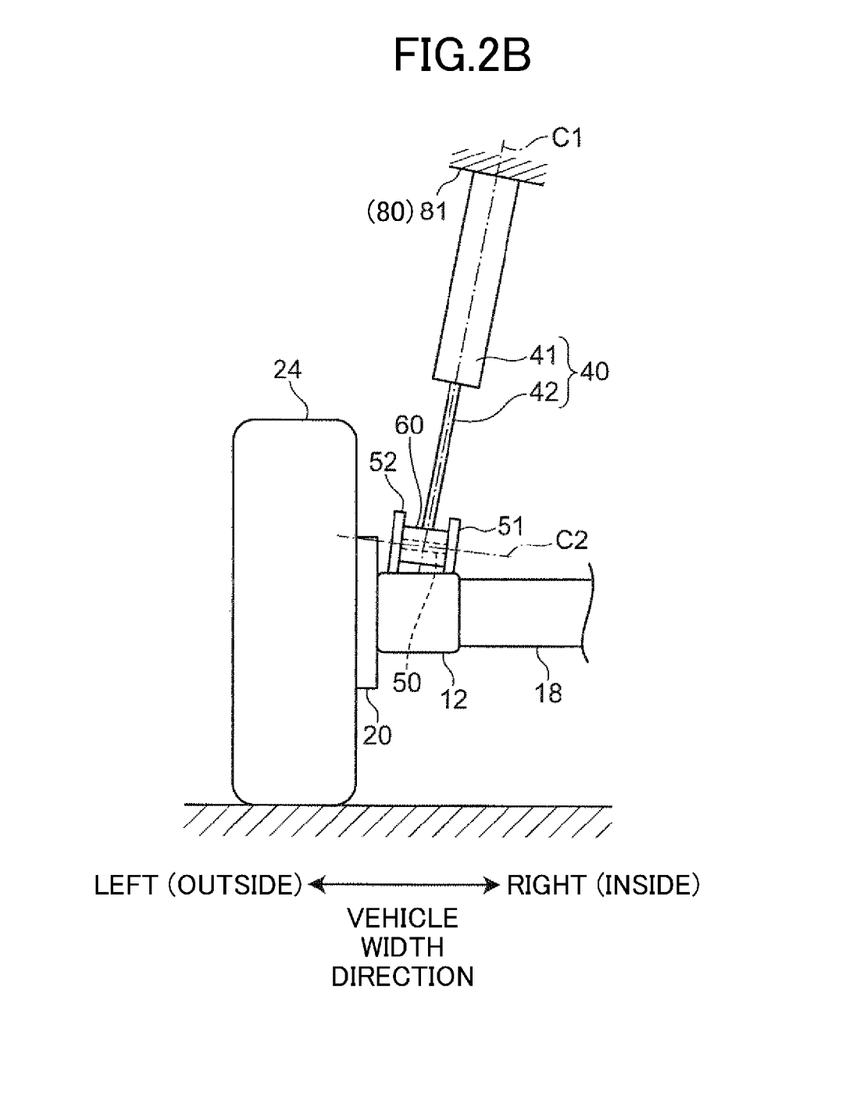
FIG. 2B is a schematic view seen from the rear of the vehicle body, illustrating the left damper and nearby components when the wheel rebounds.
Figure 3A:
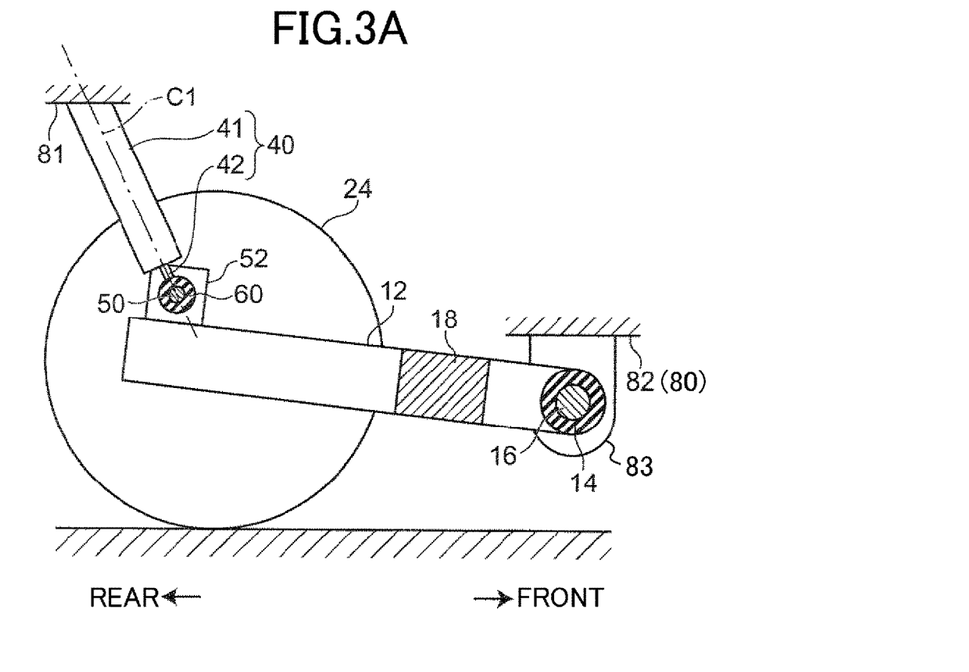
FIG. 3A is a schematic view seen from inside in the vehicle width direction, illustrating the left damper and nearby components when the wheel bumps.
Figure 3B:
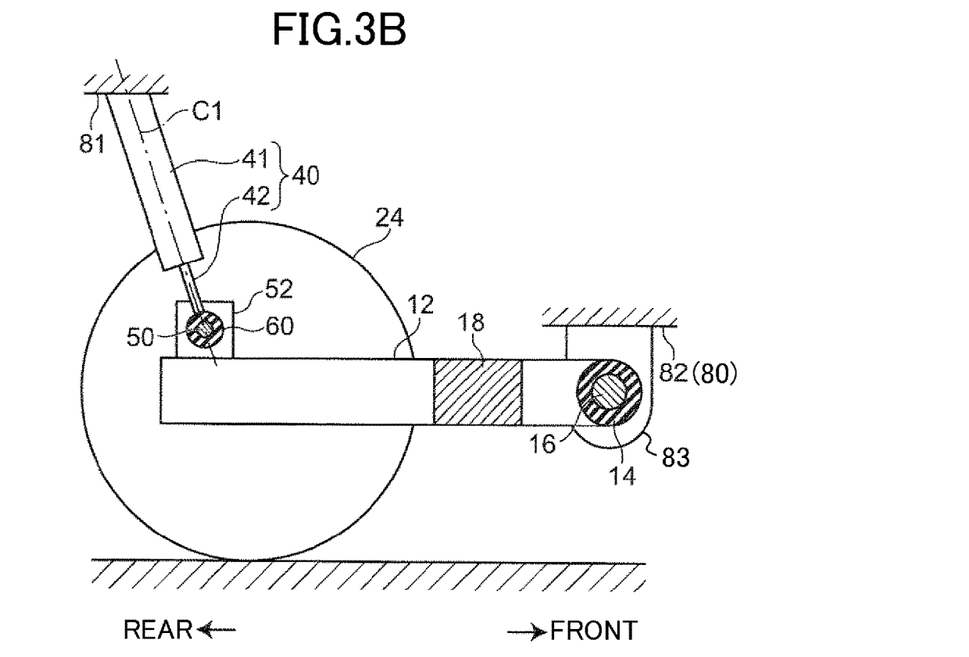
FIG. 3B is a schematic view seen from inside in the vehicle width direction, illustrating the left damper and nearby components when the wheel rebounds.

FIGS. 2A and 2B are schematic views illustrating the left damper 40 and nearby components seen from the rear. FIGS. 3A and 3B are schematic views illustrating the left damper 40 and nearby components seen from inside (right side) in the vehicle width direction. FIGS. 2A and 3A illustrate the left wheel 24 that has moved up (a bump stroke) relative to the vehicle body 80. FIGS. 2B and 3B illustrates the left wheel 24 that has moved down (a rebound stroke) relative to the vehicle body 80. The right damper 40 has the same configuration as the left damper 40 and thus the right damper 40 is not illustrated. The following mainly describes the left damper 40 and nearby components.

In the present embodiment, the upper end of the damper 40 is fixed to the rear wheelhouse 81 of the vehicle body 80. The lower end of the damper 40 is connected to a rear portion of the trailing arm 12 via a shaft 50 and a pair of brackets 51 and 52. In other words, the damper 40 is connected to the wheel 24 via the trailing arm 12 and the knuckle 20.

The shaft 50 is disposed, for example, between the pair of brackets 51 and 52 that are mounted and attached to the upper surface of the trailing arm 12. A cylindrical bush 60 is fitted onto the outer circumference of the shaft 50. The bush 60 is attached to the lower end of the damper 40. In this regard, the lower end of the damper 40 is pivotably supported by the shaft 50 via the bush 60.

The bush 60 includes a cylindrical elastic member made of rubber. The inner and outer circumferential surfaces of the bush 60 are defined by, for example, inner and outer metal tubes. The elastic member may be made of an elastic material other than rubber.

As illustrated in FIGS. 2A and 2B, the axis C1 of the damper 40 is inclined relative to the vertical direction when viewed in the vehicle's longitudinal direction. Specifically, the axis C1 of the damper 40 is inclined inward in the vehicle width direction toward the top of the vehicle.

As illustrated in FIGS. 3A and 3B, the axis C1 of the damper 40 is inclined relative to the vertical direction when viewed in the vehicle width direction. Specifically, the axis C1 of the damper 40 is inclined rearward toward the top of the vehicle.

The damper 40 extends and retracts in the axial direction of the damper 40 in accordance with the stroke of the wheel 24 in the vertical direction relative to the vehicle body 80, and the inclination angle of the axis C1 of the damper 40 varies, accordingly.

As illustrated in FIGS. 2A and 2B illustrating, respectively, a bump state and a rebound state, the inclination angle of the axis C1 of the damper 40 relative to the vertical direction when viewed in the vehicle's longitudinal direction increases as the wheel 24 strokes toward the bump side.

As illustrated in FIGS. 3A and 3B illustrating, respectively, a bump state and a rebound state, the inclination angle of the axis C1 of the damper 40 relative to the vertical direction when viewed in the vehicle width direction increases as the wheel 24 strokes toward the bump side.

The axis of the shaft 50 that supports the lower end of the damper 40 agrees with the axis of the bush 60 fitted onto the shaft 50, and the axes are hereinafter collectively referred to as an axis C2 of the bush 60. The axis C2 of the bush 60 is disposed in a direction which will be described later. The direction of the axis C2 of the bush 60 remains unchanged regardless of the strokes of the wheel. In this regard, the axis C1 of the damper 40 and the axis C2 of the bush 60 intersect at different angles in accordance with a bump or a rebound of the wheel 24.

To prevent deformation of the bush 60 due to prying forces, it is preferred that the axis C1 of the damper 40 and the axis C2 of the bush 60 intersect at a right angle. However, the angle changes in accordance with the bump or the rebound of the wheel 24, and therefore cannot be kept at the right angle all the time.

In view of this, according to the present embodiment, the axis C2 of the bush 60 is disposed such that the angle between the axis C1 of the damper 40 and the axis C2 of the bush 60 is kept at, or close to, the right angle even when the wheel 24 bumps or rebounds. This configuration reduces deformation of the bush 60 due to prying forces.

Now, the disposition of the axis C2 of the bush 60 will be described with reference to FIG. 4.

Figure 4:
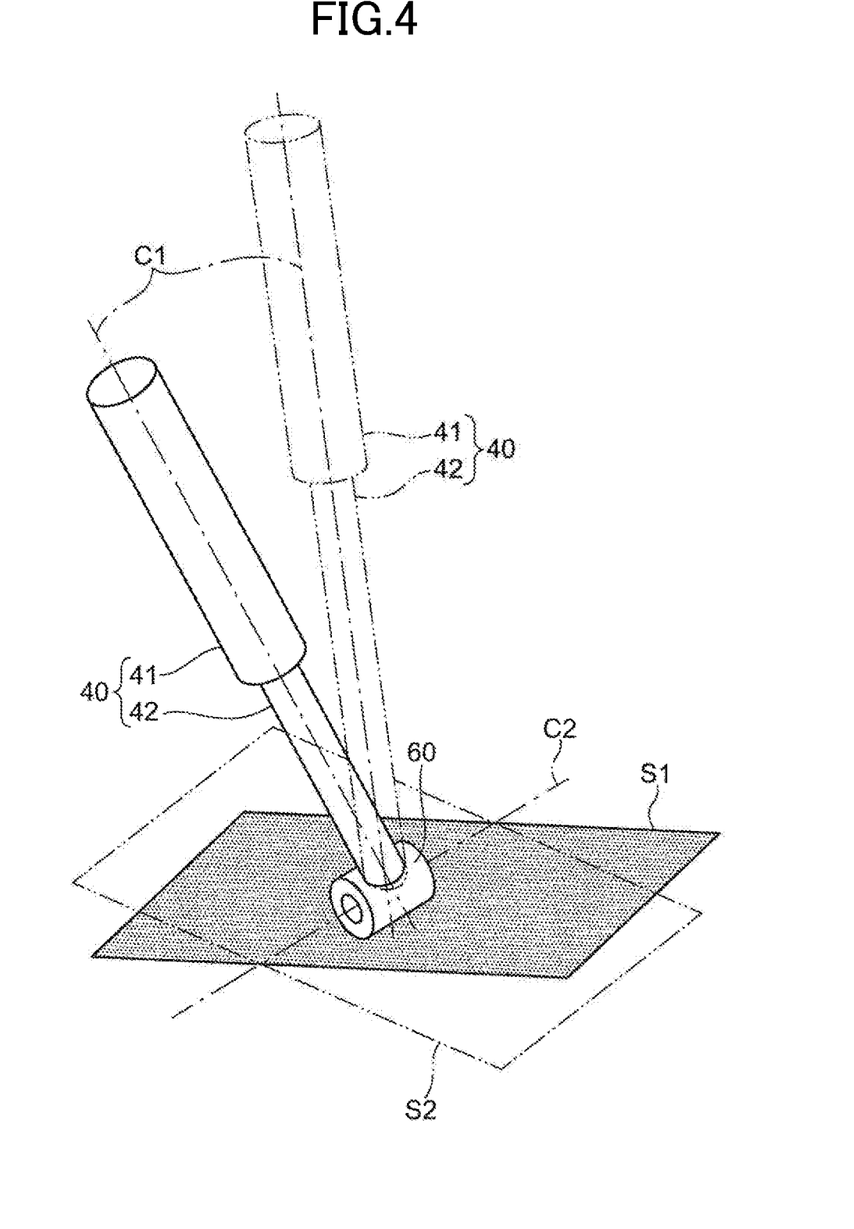
FIG. 4 is a perspective view illustrating a first plane and a second plane perpendicular to the axis of the damper.

FIG. 4 illustrates an imaginary first plane S1 (indicated by a solid line) and an imaginary second plane S2 (indicated by long-dash and double-dot line). The first plane S1 is orthogonal to the axis C1 of the damper 40 when the stroke position of the wheel 24 is a first position in the vertical direction relative to the vehicle body 80. The second plane S2 is orthogonal to the axis C1 of the damper 40 when the stroke position of the wheel 24 is a second position, which is different from the first position and close to the rebound position relative to the first position.

The first plane S1 and the second plane S2 are located at a position in the longitudinal direction of the damper 40 at which the axis C2 of the bush 60 is supposed to pass, and at which the first plane S1 and the second plane S2 are orthogonal to the axis C1 of the damper 40. The axis C2 of the bush 60 is disposed along the line of intersection (on the line of intersection) between the first plane S1 and the second plane S2. This configuration allows the axis C2 of the bush 60 to be orthogonal to the axis C1 of the damper 40 in both of the cases in which the wheel 24 is in the first position and in the second position in the vertical direction relative to the vehicle body 80. This configuration substantially prevents deformation of the bush 60 due to prying forces. The axis C2 of the bush 60 may be disposed along a line (on a line) parallel to the line of intersection between the first plane S1 and the second plane S2.

When the wheel 24 is at any stroke position between the first position and the second position, the intersection angle between the axis C1 of the damper 40 and the axis C2 of the bush 60 is always an angle close to the right angle, which can effectively reduce deformation of the bush 60 due to prying forces.

In one preferred embodiment, for example, the first position is close to the bump side relative to a predetermined reference position, and the second position is close to the rebound position relative to the predetermined reference position.

The predetermined reference position is, for example, a position of the wheel when the vehicle stopping on a horizontal road surface carries a predetermined amount of load. The predetermined amount of load is, for example, a load of the vehicle carrying no person or no cargo, but with a full fuel tank.

Setting the first position and the second position to such positions as described above allows the axis C1 of the damper 40 to be orthogonal to the axis C2 of the bush 60 when the wheel is in the first position close to the bump position relative to the predetermined reference position and when the wheel is in the second position close to the rebound position relative to the predetermined reference position. It is therefore possible to substantially prevent deformation of the bush 60 due to prying forces. In addition, the deformation of the bush 60 due to prying forces is effectively reduced when the wheel 24 bumps and rebounds while the vehicle is running. In this regard, the damper 40 operates smoothly, thereby providing good ride comfort and good handling stability of the vehicle.

The first position is close to the bump side relative to the predetermined reference position, and the second position is close to the rebound position relative to the predetermined reference position. More specifically, the first position and the second position are located, for example, at the following positions.

The first position may be a position at the time when two people having a certain weight are seated in the front seats (the driver's seat and the passenger seat) of the vehicle stopping on a horizontal road surface. This configuration substantially reduces deformation of the bush 60 due to prying forces when a driver and a passenger are seated in the front seats of the vehicle, which is a situation typically and highly frequently seen in a vehicle. This configuration can provide a better ride comfort and handling stability of the vehicle.

In another example, the first position may be a position in which the damper 40 is most retracted (a position closest to the bump side). In this case, when the wheel's stroke position is closest to the bump side, the axis C1 of the damper 40 is orthogonal to the axis C2 of the bush 60. Moreover, when the wheel is at any stroke position between the predetermined reference position and the first position (that is, at any stroke position in the entire range of the wheel stroke from the reference position to the position closest to the bump side), the intersection angle between the axis C1 of the damper 40 and the axis C2 of the bush 60 is always an angle close to the right angle. This configuration can effectively reduce deformation of the bush 60 due to prying forces when the wheel 24 bumps.

In still another example, the first position may be a position at the time when the vehicle stopping on a horizontal road surface carries the maximum number of passengers having a certain weight. In this case, when the vehicle carries the maximum number of passengers, which means that the wheel's stroke position is at a bump position, the axis C1 of the damper 40 is orthogonal to the axis C2 of the bush 60. Moreover, when the wheel is in any other positions close to this bump position, the intersection angle between the axis C1 of the damper 40 and the axis C2 of the bush 60 is always close to the right angle. This configuration can effectively reduce deformation of the bush 60 due to prying forces when the wheel 24 bumps.

In yet another example, the first position may be a position at the time when the vehicle stopping on a horizontal road surface carries the maximum load. When the vehicle carries the maximum load, which means that the wheel's stroke position is at a bump position, the axis C1 of the damper 40 is orthogonal to the axis C2 of the bush 60. Moreover, when the wheel is in any other positions close to this bump position, the intersection angle between the axis C1 of the damper 40 and the axis C2 of the bush 60 is always close to the right angle. This configuration can effectively prevent deformation of the bush 60 due to prying forces when the wheel 24 bumps.

The second position, which is close to the rebound side relative to the predetermined reference position, may be a position in which the damper 40 is most extended (a position closest to the rebound side). In this case, when the wheel's stroke position is closest to the rebound side, the axis C1 of the damper 40 is orthogonal to the axis C2 of the bush 60. Moreover, when the wheel is at any stroke position between the predetermined reference position and the second position (that is, at any stroke position in the entire range of the wheel stroke from the reference position to the position closest to the rebound side), the intersection angle between the axis C1 of the damper 40 and the axis C2 of the bush 60 is always close to the right angle. This configuration can effectively reduce deformation of the bush 60 due to prying forces when the wheel 24 rebounds.

Figure 5A:
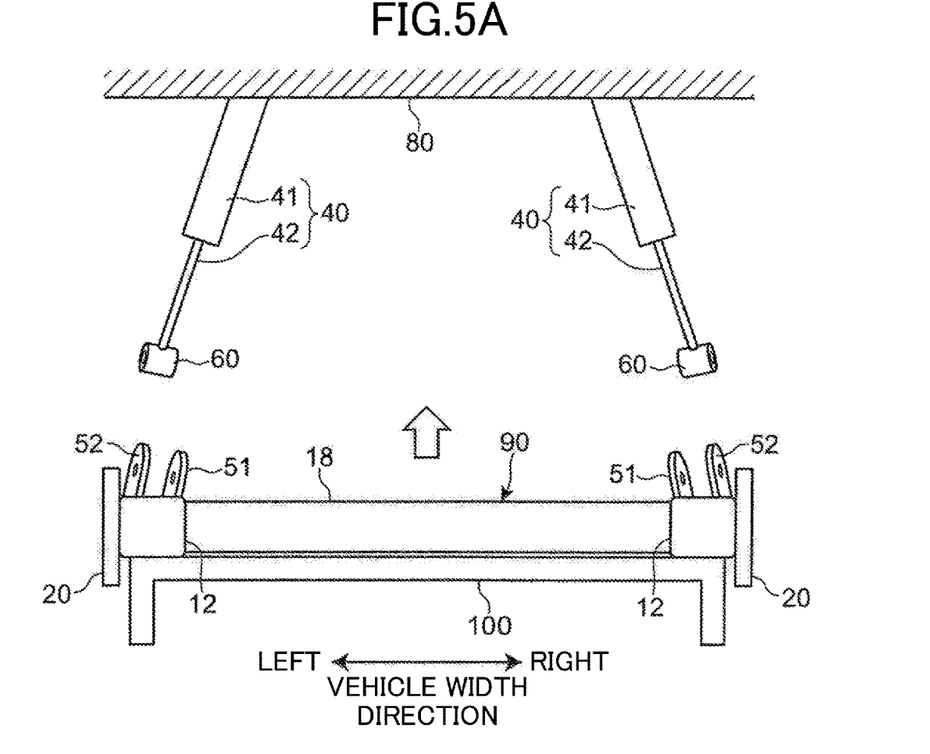
FIG. 5A is a schematic view seen from the rear of the vehicle body, illustrating an example procedure of mounting the suspension device (rear suspension) to the vehicle body.
Figure 5B:
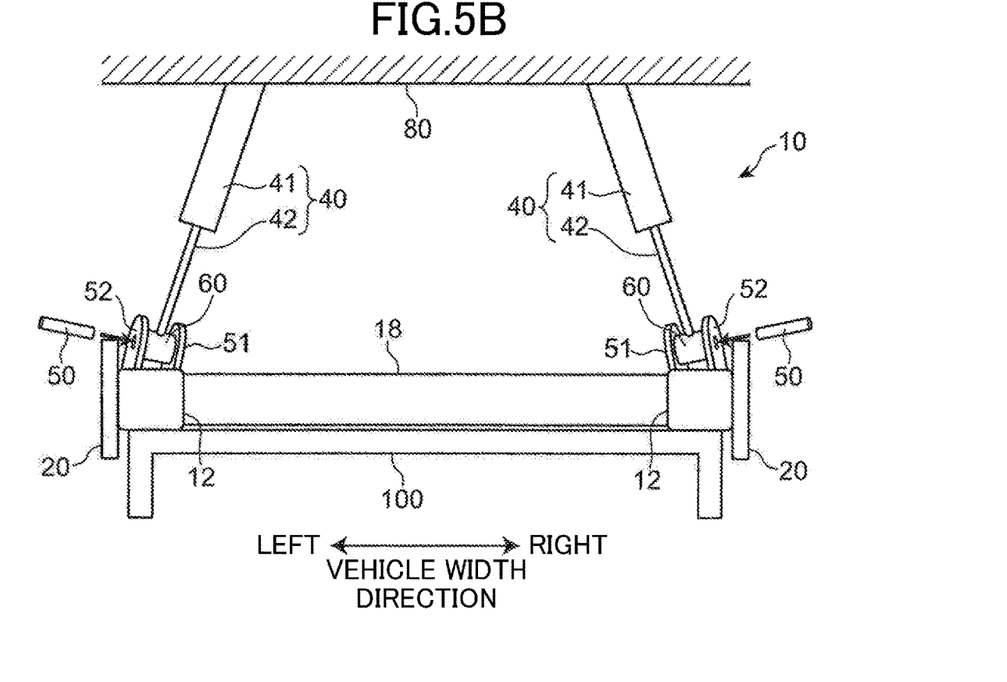
FIG. 5B is a schematic vie seen from the rear of the vehicle body, illustrating a subsequent procedure of mounting the suspension device (rear suspension) after the process illustrated in FIG. 5A.

FIGS. 5A and 5B illustrate a procedure of mounting the suspension 10 in a vehicle production process. The second position which may prevent deformation of the bush 60 due to prying forces can be determined in this mounting procedure.

Specifically, as illustrated in FIG. 5A, an assembly 90, which is an integrated part of the left and right trailing arms 12, the torsion beam 18, and the left and right knuckles 20, is placed on a lift 100. The lift 100 is raised to bring the assembly 90 closer to the left and right dampers 40 and the bushes 60, which have already been mounted to the vehicle body 80.

At this moment, the dampers 40 hanging from the vehicle body 80 are most extended because of, for example, the weight of the piston rod 42 and the pressure of the gas inside the cylinder 41.

Subsequently, although not illustrated in FIGS. 5A and 5B, the bushes 14 attached to the front ends of the trailing arms 12 are mounted to the vehicle body 80 (to the support members 83 mounted and fixed to the rear-side frame 82) via the shafts 16.

Next, as illustrated in FIG. 5B, the bushes 60 attached to the lower ends of the dampers 40 are mounted to the respective pairs of brackets 51 and 52 attached to the trailing arms 12. In this procedure, the shaft 50 is inserted in holes of the pair of brackets 51 and 52 and a hole formed in the center of the bush 60, and the shaft 50 is fixed thereto, without causing any deformation of the bush 60 due to prying forces. To fix the shaft 50, for example, a bolt is used as the shaft 50 and a nut is tightened onto an end screw portion of the shaft 50.

The suspension 10 is assembled in accordance with the procedure described above, and the second position which may prevent deformation of the bush 60 due to prying forces can be determined in this mounting procedure.

Figure 6:
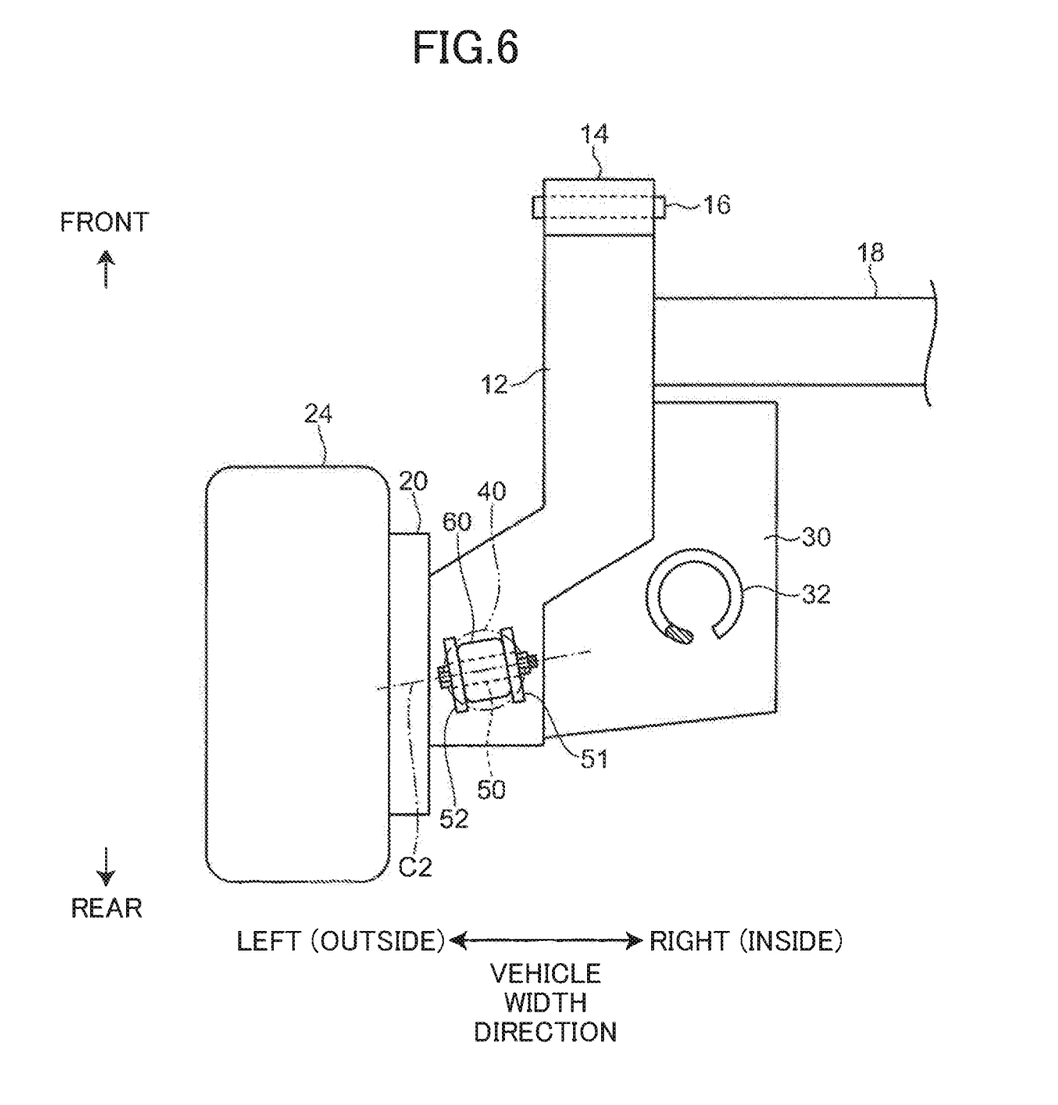
FIG. 6 is a schematic view seen from above the vehicle body, illustrating the lower end of the left damper and nearby components.

In the present embodiment, the axis C2 of the bush 60 is disposed relative to the axis C1 of the damper 40 as described above and, as illustrated in FIGS. 2A and 2B, the axis C2 of the bush 60 is inclined downward toward the inside in the vehicle width direction when viewed in the longitudinal direction. As illustrated in FIG. 6, the axis C2 of the bush 60 is inclined frontward toward the inside in the vehicle width direction when viewed in the vertical direction.

Disposing the axis C2 of the bush 60 as described above can effectively reduce the deformation of the bush 60 due to prying forces regardless of the stroke position of the wheel 24 in the vertical direction relative to the vehicle body 80. Moreover, such disposition can substantially prevent greater torsion, compared to torsion in a conventional case, from occurring in the bush 60. Preventing the torsion in the bush 60 can effectively reduce an increase in friction in the damper 40 caused by the reaction force of the bush 60. In this regard, the damper 40 can operate smoothly, thereby providing a better ride comfort and handling stability of the vehicle.

According to the present embodiment, disposing the axis C2 of the bush 60 as described above can effectively reduce deformation of the bush 60 due to prying forces, and can also dispose the damper 40 so as to be inclined inward in the vehicle width direction toward the top of the vehicle. This disposition can substantially prevent the damper 40 from contacting the wheel 24 (tire) and can dispose the lower end of the damper 40 close to the hub 25 of the wheel 24 in the vehicle width direction. This configuration facilitates reducing a moment about an axis extending in the longitudinal direction though the lower end of the damper 40 when a load is applied from the road surface to the hub 25 of the wheel 24. Such reduction in the moment can reduce bending of the torsion beam 18 caused by the moment and can reduce the possibility of damage to the torsion beam 18.

The present invention is not limited to the above-described embodiment and various modifications can be made without departing from the scope of the invention as defined by the appended claims.

Figure 7A:
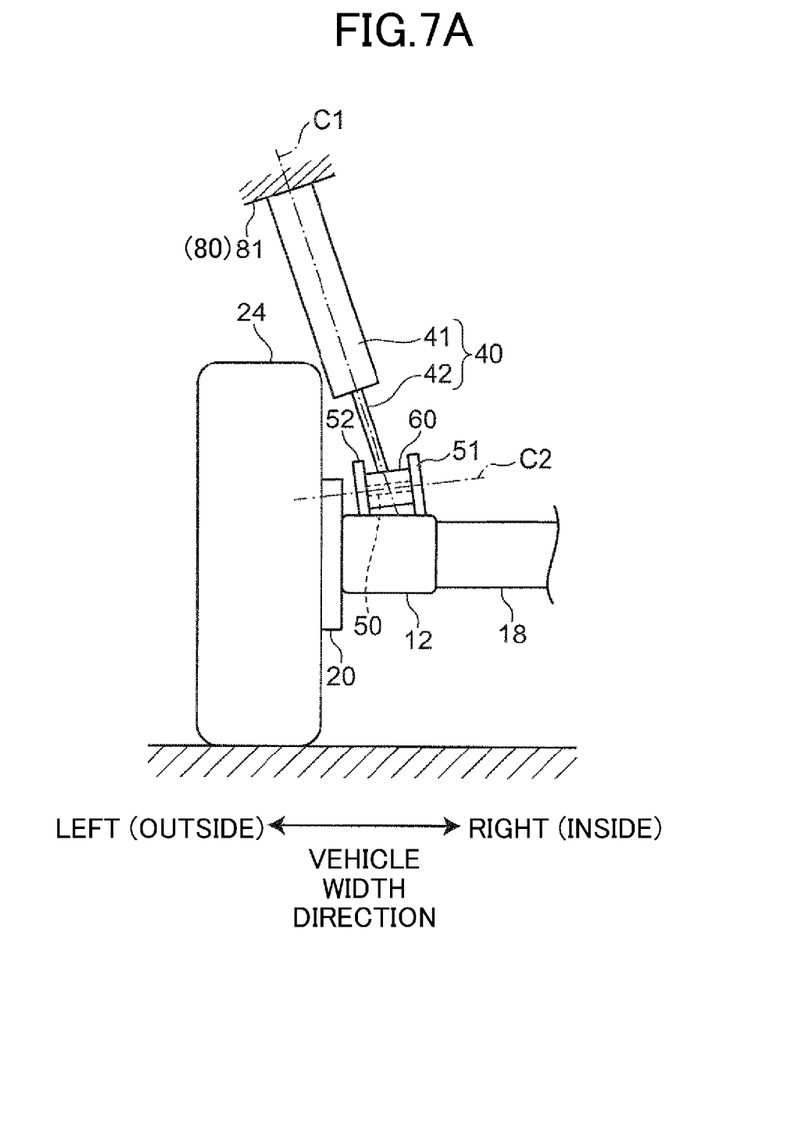
FIG. 7A is a diagram corresponding to FIG. 2A, illustrating a suspension device for vehicles according to a modification of the embodiment.
Figure 7B:
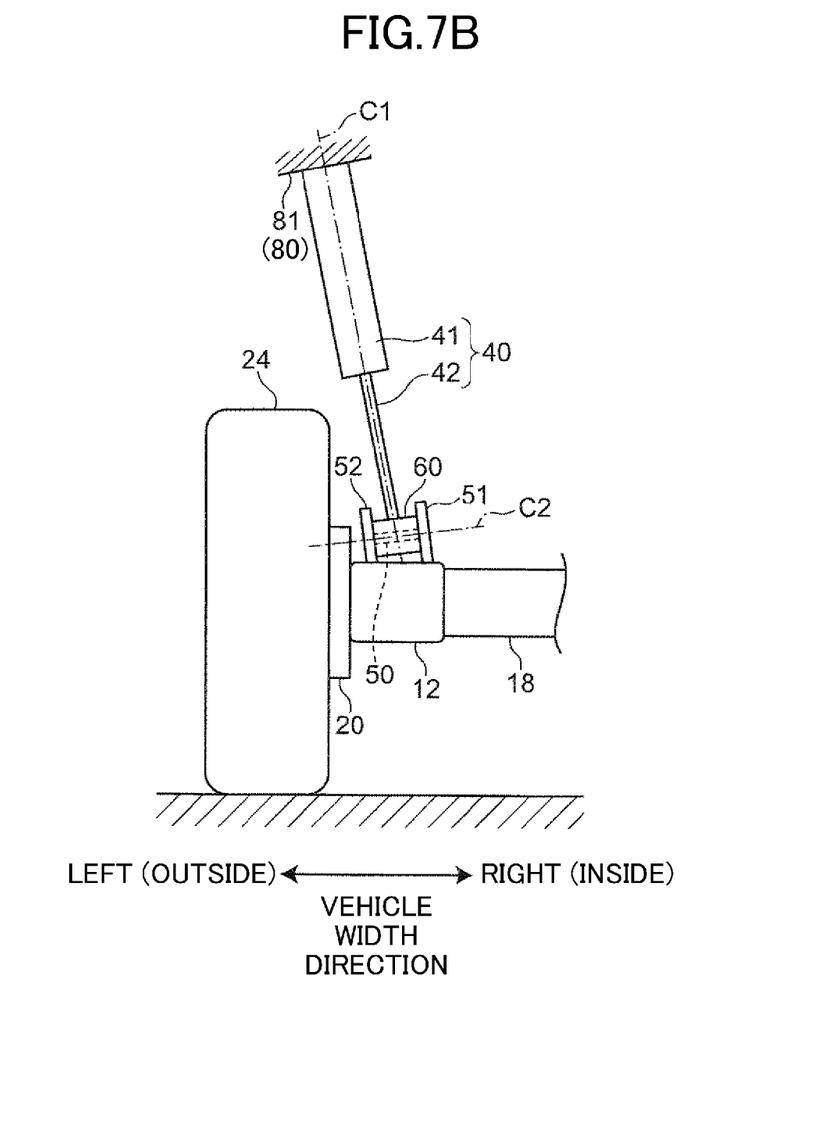
FIG. 7B is a diagram corresponding to FIG. 2B, illustrating the suspension device according to the modification.

In the above-described embodiment, for example, the axis C1 of the damper 40 is inclined inward in the vehicle width direction toward the top of the vehicle, but as illustrated in FIGS. 7A and 7B, the axis C1 of the damper 40 may be inclined outward in the vehicle width direction toward the top of the vehicle, when viewed in the longitudinal direction.

Figure 8:
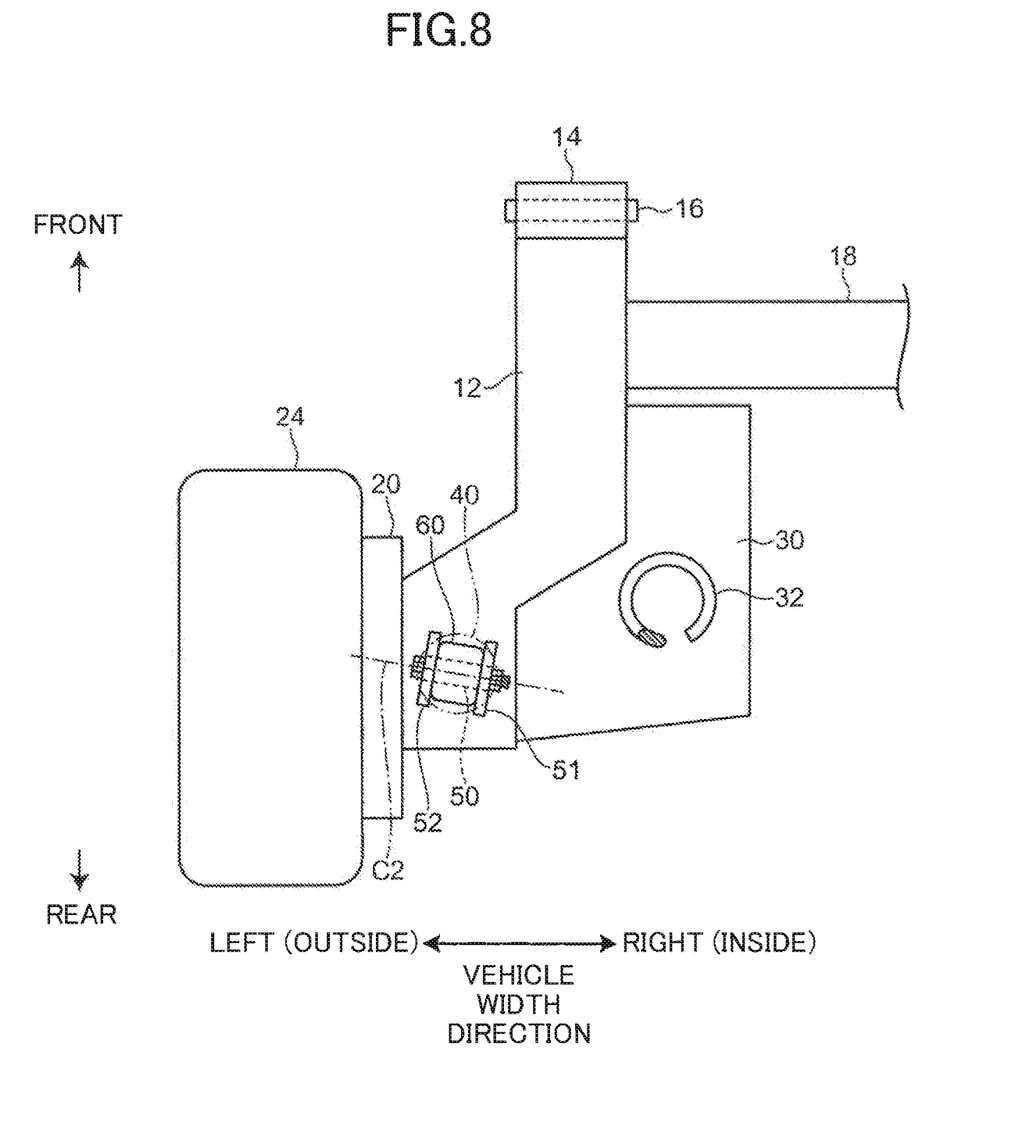
FIG. 8 is a diagram corresponding to FIG. 6, illustrating the suspension device according to the modification.

In this case, in a condition in which the axis C1 of the damper 40 is inclined rearward toward the top of the vehicle when viewed in the vehicle width direction as in the above embodiment (see FIGS. 3A and 3B), the axis C2 of the bush 60, which is disposed along the line of intersection between the imaginary first plane S1 and the imaginary second plane S2 as in the above embodiment, is inclined upward toward the inside the vehicle width direction as illustrated in FIGS. 7A and 7B when viewed in the longitudinal direction, and is inclined rearward toward the inside in the vehicle width direction as illustrated in FIG. 8 when viewed in the vertical direction.

Similarly to the above embodiment, this configuration too can effectively reduce deformation of the bush 60 due to prying forces regardless of the stroke position of the wheel 24 in the vertical direction relative to the vehicle body 80. Preventing deformation of the bush 60 due to prying forces can in turn effectively reduce an increase in friction in the damper 40 caused by the reaction force of the bush 60 and thus the damper 40 can operate smoothly.

In the above embodiment, the axis C1 of the damper 40 is inclined rearward toward the top of the vehicle, but the present invention is also applicable to a case in which the axis C1 of the damper 40 is inclined frontward toward the top of the vehicle.

In the above embodiment, the shaft 16 defining the swing axis of the trailing arm 12 is located in front of the bush 60, but the present invention is also applicable to a case in which the swing axis of the trailing arm 12 is located at the rear of the bush 60.

In the above embodiment, the bush 60 is interposed between the lower end of the damper 40 and the shaft 50, and disposition of the axis C2 of the bush 60 has been described. If the bush is interposed between the upper end of the damper 40 and a shaft that pivotally supports the upper end, the axis of the bush can be disposed in the same manner as the embodiment of the present invention and this can effectively reduce deformation of the bush due to prying forces.

In the above embodiment, a torsion beam suspension has been described as an example of the suspension device for vehicles, but the present invention is applicable to any suspension device including a damper at least an end of which is supported by a shaft via a bush.

Moreover, the present invention is applicable not only to the rear suspension for the rear wheels, but also to a front suspension for front wheels.

The above embodiment is presented for illustrative purposes only and is not intended to limit the scope of the present invention. The scope of the present invention is defined by the appended claims, and changes or modifications that come within the meaning and range of equivalency of the claims are therefore intended to be embraced therein.

INDUSTRIAL APPLICABILITY

The present invention is applicable to a suspension device for vehicles including a damper an end of which is supported by a shaft via a bush.

DESCRIPTION OF REFERENCE CHARACTERS

10 Rear Suspension (Suspension Device For Vehicles)
12 Trailing Arm
16 Shaft (Connecting Part)
18 Torsion Beam
20 Knuckle
24 Wheel (Rear Wheel)
40 Damper
50 Shaft
60 Bush
80 Vehicle Body
C1 Axis of Damper
C2 Axis of Bush
S1 First Plane
S2 Second Plane

The invention claimed is:

1. A suspension device for vehicles, the suspension device comprising:
a damper disposed between a wheel of a vehicle and a vehicle body of the vehicle and configured to extend and retract between the wheel and the vehicle body;
a shaft configured to pivotably support an end of the damper;
a bush including a cylindrical elastic member fitted onto an outer circumference of the shaft and interposed between the shaft and the damper;
a pair of left and right trailing arms extending in a longitudinal direction of the vehicle; and
a bracket connected to one of the pair of left and right trailing arms,
wherein
the bush is mounted to the bracket such that an axis of the bush is disposed along a line of intersection between an imaginary first plane and an imaginary second plane, or along a line parallel to the line of intersection, the first plane being orthogonal to an axis of the damper when a stroke position of the wheel is a first position relative to the vehicle body in a vertical direction of the vehicle body, the second plane being orthogonal to the axis of the damper when the stroke position of the wheel is a second position different from the first position;
the first position is a position in which the damper is most retracted, and
the second position is a position in which the damper is most extended.

2. The suspension device of claim 1, wherein
the first position is close to a bump side relative to a predetermined reference position, and
the second position is close to a rebound side relative to the predetermined reference position.

3. The suspension device of claim 1, further comprising a second bush at a front end of each of the pair of left and right trailing arms, wherein the second position is determined by:
hanging the damper from the vehicle body to extend the damper,
thereafter mounting the second bush to the vehicle body,
thereafter mounting the lower end of the damper to the bracket, and
inserting the shaft to the bracket and the bush to fix the shaft.

4. The suspension device of claim 1, further comprising:
a knuckle configured to support the wheel; and
a connecting part configured to connect a front portion of the trailing arm in the vehicle's longitudinal direction to the vehicle body,
wherein
one of the pair of left and right trailing arms is connected to the knuckle,
the axis of the damper is inclined inward in a vehicle width direction toward a top of the vehicle, the bush is fitted onto the outer circumference of the shaft that connects a lower end of the damper to a rear portion of the trailing arm in the vehicle's longitudinal direction, and the axis of the bush is inclined frontward in the vehicle's longitudinal direction toward an inside in the vehicle width direction.

5. The suspension device of claim 4, wherein the axis of the damper is inclined rearward in the vehicle's longitudinal direction toward a top of the vehicle, the axis of the bush is inclined downward toward an inside in the vehicle width direction, and the bush is mounted to the bracket with the axis of the bush inclined in the vehicle width direction, in a vertical direction of the vehicle body, and in the vehicle's longitudinal direction such that the axis of the damper and the axis of the bush are orthogonal to each other at both the first and second positions.

6. The suspension device of claim 1, further comprising:

a knuckle configured to support the wheel; and a connecting part configured to connect a front portion of the trailing arm in the vehicle's longitudinal direction to the vehicle body, wherein one of the pair of left and right trailing arms is connected to the knuckle, the axis of the damper is inclined outward in a vehicle width direction toward a top of the vehicle, the bush is fitted onto the outer circumference of the shaft that connects a lower end of the damper to a rear portion of the trailing arm in the vehicle's longitudinal direction, and the axis of the bush is inclined rearward in the vehicle's longitudinal direction toward an inside in the vehicle width direction.

7. The suspension device of claim 6, wherein the axis of the damper is inclined rearward in the vehicle's longitudinal direction toward a top of the vehicle, the axis of the bush is inclined upward toward an inside in the vehicle width direction, and the bush is mounted to the bracket with the axis of the bush inclined in the vehicle width direction, in a vertical direction of the vehicle body, and in the vehicle's longitudinal direction such that the axis of the damper and the axis of the bush are orthogonal to each other at both the first and second positions.

8. A suspension device for vehicles, the suspension device comprising:

a damper disposed between a wheel of a vehicle and a vehicle body of the vehicle and configured to extend and retract between the wheel and the vehicle body;

a shaft configured to pivotably support an end of the damper;

a bush including a cylindrical elastic member fitted onto an outer circumference of the shaft and interposed between the shaft and the damper;

a pair of left and right trailing arms extending in a longitudinal direction of the vehicle; and a bracket connected to one of the pair of left and right trailing arms, wherein the bush is mounted to the bracket such that an axis of the bush is disposed along a line of intersection between an imaginary first plane and an imaginary second plane, or along a line parallel to the line of intersection, the first plane being orthogonal to an axis of the damper when a stroke position of the wheel is a first position relative to the vehicle body in a vertical direction of the vehicle body, the second plane being orthogonal to the axis of the damper when the stroke position of the wheel is a second position different from the first position, the first position is close to a bump side relative to a predetermined reference position, the first position is a position at a time when two people having a certain weight are seated in front seats of the vehicle stopping on a horizontal road surface, the second position is close to a rebound side relative to the predetermined reference position, and the second position is a position in which the damper is most extended.

9. The suspension device of claim 8, further comprising:

a knuckle configured to support the wheel; and a connecting part configured to connect a front portion of the trailing arm in the vehicle's longitudinal direction to the vehicle body, wherein one of the pair of left and right trailing arms is connected to the knuckle, the axis of the damper is inclined inward in a vehicle width direction toward a top of the vehicle, the bush is fitted onto the outer circumference of the shaft that connects a lower end of the damper to a rear portion of the trailing arm in the vehicle's longitudinal direction, and the axis of the bush is inclined frontward in the vehicle's longitudinal direction toward an inside in the vehicle width direction.

10. The suspension device of claim 8, further comprising:

a knuckle configured to support the wheel; and a connecting part configured to connect a front portion of the trailing arm in the vehicle's longitudinal direction to the vehicle body, wherein one of the pair of left and right trailing arms is connected to the knuckle, the axis of the damper is inclined outward in a vehicle width direction toward a top of the vehicle, the bush is fitted onto the outer circumference of the shaft that connects a lower end of the damper to a rear portion of the trailing arm in the vehicle's longitudinal direction, and the axis of the bush is inclined rearward in the vehicle's longitudinal direction toward an inside in the vehicle width direction.

11. A suspension device for vehicles, the suspension device comprising:

a damper disposed between a wheel of a vehicle and a vehicle body of the vehicle and configured to extend and retract between the wheel and the vehicle body;

a shaft configured to pivotably support an end of the damper;

a bush including a cylindrical elastic member fitted onto an outer circumference of the shaft and interposed between the shaft and the damper;

a pair of left and right trailing arms extending in a longitudinal direction of the vehicle; and a bracket connected to one of the pair of left and right trailing arms, wherein the bush is mounted to the bracket such that an axis of the bush is disposed along a line of intersection between an imaginary first plane and an imaginary second plane, or along a line parallel to the line of intersection, the first plane being orthogonal to an axis of the damper when a stroke position of the wheel is a first position relative to the vehicle body in a vertical direction of the vehicle body, the second plane being orthogonal to the axis of the damper when the stroke position of the wheel is a second position different from the first position, the first position is close to a bump side relative to a predetermined reference position, the first position is a position in which the damper is most retracted, the second position is close to a rebound side relative to the predetermined reference position, and the second position is a position in which the damper is most extended.

12. The suspension device of claim 11, further comprising:

a knuckle configured to support the wheel; and a connecting part configured to connect a front portion of the trailing arm in the vehicle's longitudinal direction to the vehicle body, wherein one of the pair of left and right trailing arms is connected to the knuckle, the axis of the damper is inclined inward in a vehicle width direction toward a top of the vehicle, the bush is fitted onto the outer circumference of the shaft that connects a lower end of the damper to a rear portion of the trailing arm in the vehicle's longitudinal direction, and the axis of the bush is inclined frontward in the vehicle's longitudinal direction toward an inside in the vehicle width direction.

13. The suspension device of claim 11, further comprising:

a knuckle configured to support the wheel; and a connecting part configured to connect a front portion of the trailing arm in the vehicle's longitudinal direction to the vehicle body, wherein one of the pair of left and right trailing arms is connected to the knuckle, the axis of the damper is inclined outward in a vehicle width direction toward a top of the vehicle, the bush is fitted onto the outer circumference of the shaft that connects a lower end of the damper to a rear portion of the trailing arm in the vehicle's longitudinal direction, and the axis of the bush is inclined rearward in the vehicle's longitudinal direction toward an inside in the vehicle width direction.

14. A suspension device for vehicles, the suspension device comprising:

a damper disposed between a wheel of a vehicle and a vehicle body of the vehicle and configured to extend and retract between the wheel and the vehicle body;

a shaft configured to pivotably support an end of the damper;

a bush including a cylindrical elastic member fitted onto an outer circumference of the shaft and interposed between the shaft and the damper;

a pair of left and right trailing arms extending in a longitudinal direction of the vehicle; and a bracket connected to one of the pair of left and right trailing arms, wherein the bush is mounted to the bracket with the axis of the bush inclined in the vehicle width direction, in the vertical direction of the vehicle body, and in a longitudinal direction of the vehicle such that the axis of the bush is disposed along a line of intersection between an imaginary first plane and an imaginary second plane, or along a line parallel to the line of intersection, the first plane being orthogonal to an axis of the damper when a stroke position of the wheel is a first position relative to the vehicle body in a vertical direction of the vehicle body, and the second plane being orthogonal to the axis of the damper when the stroke position of the wheel is a second position different from the first position.

* * * * *